United States Patent [19]

Dalgoutte

[11] 4,124,364
[45] Nov. 7, 1978

[54] METHOD FOR MAKING GLASS SLEEVE FIBER SPLICE

[75] Inventor: David G. Dalgoutte, Harlow, England

[73] Assignee: International Standard Electric Corporation, New York, N.Y.

[21] Appl. No.: 746,903

[22] Filed: Dec. 2, 1976

[51] Int. Cl.² .................................. C03B 37/00
[52] U.S. Cl. ........................ 65/4 B; 65/DIG. 7; 350/96.21
[58] Field of Search ............ 65/4 B, DIG. 7; 350/96 C, 96 R

[56] References Cited

U.S. PATENT DOCUMENTS

| | | | |
|---|---|---|---|
| 3,455,625 | 7/1969 | Brumley | 350/96 C |
| 3,579,316 | 5/1971 | Dyott et al. | 65/4 B |
| 3,861,781 | 1/1975 | Hasegawa et al. | 65/4 B |
| 3,870,395 | 3/1975 | Schicketanz | 360/96 R X |
| 3,906,221 | 9/1975 | Mercier | 360/96 R X |
| 3,948,582 | 4/1976 | Martin | 65/DIG. 7 |
| 3,972,585 | 8/1976 | Dalgleish et al. | 350/96 C |
| 4,030,810 | 6/1977 | Khoe | 360/96 C |

FOREIGN PATENT DOCUMENTS

1,449,787  9/1976  United Kingdom ................ 350/96 C

OTHER PUBLICATIONS

Optical Fibre-Connector, Dalgleish et al., Electronic Letters, vol. 11, No. 1, pp. 24-26, Jan. 9, 1975.

*Primary Examiner*—Robert L. Lindsay, Jr.
*Attorney, Agent, or Firm*—John T. O'Halloran; Alfred C. Hill

[57] ABSTRACT

A pair of optical fibers is connected by means of a glass sleeve having a lower melting point than the fibers and a bore having a clearance fit over the ends of the fibers to be joined. One fiber is inserted into one end of the sleeve and the sleeve is heated to collapse over the fiber end. Index matching fluid is introduced into the other end of the sleeve before inserting the other fiber therein.

7 Claims, 4 Drawing Figures

METHOD FOR MAKING GLASS SLEEVE FIBER SPLICE

FIELD OF THE INVENTION

This invention relates to the joining of glass optical fibres and is a modification of the method of joining optical fibres described and claimed in our U.S. application Ser. No. 676,731 filed Apr. 14, 1976.

BACKGROUND OF THE INVENTION

One of the limitations of the method described in the parent Specification is that it does not provide for the inclusion of an index matching medium at the butted fibre ends, and therefore the ends need to be flat and substantially normal to the fibre axes if a high coupling efficiency is to be achieved.

SUMMARY OF THE INVENTION

According to the present invention there is provided a method of butt joining a pair of glass optical fibres which method includes the steps of introducing a bare end of one member of the pair of optical fibres into one end of a glass sleeve having a melting point lower than that of the fibre and a bore that is a clearance fit over the bare fibre, of heating the sleeve in the region intermediate said one end of the sleeve and the end of the fibre so as to collaspe said region on to the fibre and to cause said collapsed region to propagate to substantially the end of the fibre, of introducing the end of the other member of the pair of optical fibres into the other end of the sleeve, and of securing the two fibres in substantially butting relationship with an index matching medium between their ends.

The present invention is like that of our aforementioned U.S. application No. 676,731, in obtaining alignment of the fibres by causing the central portion of a glass sleeve to collapse to the appropriate size for holding the fibres in alignment, but the present invention affords the advantage that, with only one fibre engaged in the sleeve at the time of collapse, there is no risk of the sleeve being distorted during the collapse by misalignment of the fibre ends.

There follows a description of the method of forming a butt joint between a pair of fibres in a sleeve so as to form an optical fibre splice embodying the invention in a preferred form.

DESCRIPTION OF THE PREFERRED EMBODIMENT

Figure 1:
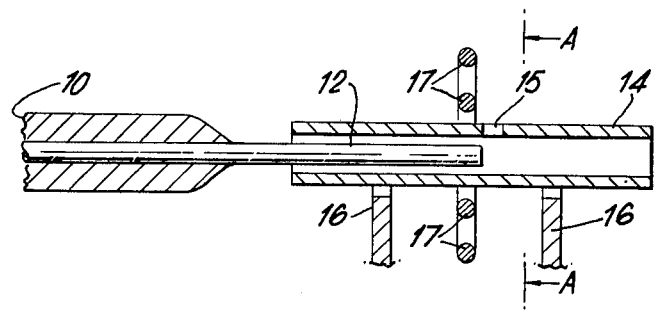
FIG. 1 depicts a longitudinal section through the sleeve together with one of the fibres before the sleeve has been collapsed on to the fibre.
Figure 2:
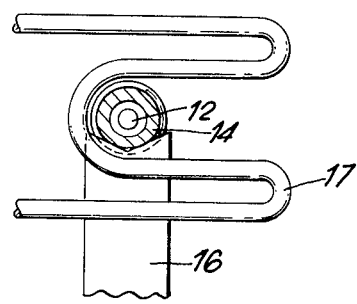
FIG. 2 depicts a transverse section on the line AA of FIG. 1.
Figure 3:
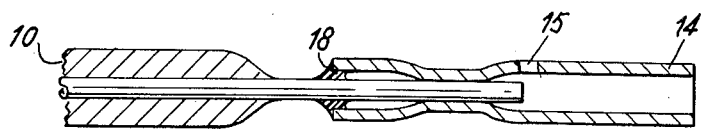
FIG. 3 depicts a longitudinal section through the sleeve and fibre after collapse.
Figure 4:
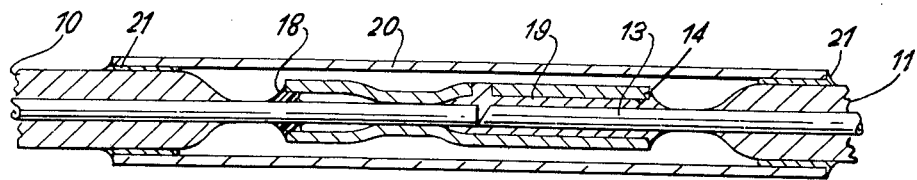
FIG. 4 depicts a longitudinal section of the completed splice.

The ends of a pair of silica optical fibres 10, 11 are prepared for splicing by stripping a plastics protective coating from the last few millimeters at the end of each to leave exposed regions 12, 13 of bare fibre typically 100 $\mu$m in diameter. The diameter of the plastics cladding is typically 1mm in diameter.

The fibre ends are butted together in a sleeve 14 made of a glass having a melting point lower than of the silica fibres. The sleeve is conveniently made by drawing down a piece of larger diameter tubing, and a region of the drawn down tubing is selected where the bore diameter is a clearance fit over the bared fibre ends. The sleeve in this instance is about 1 cm long, has an external diameter of about 400 $\mu$m and a bore of about 130 $\mu$m. Optionally the sleeve may be provided with an aperture 15. This is conveniently made by laser machining using a $CO_2$ laser. Another optional feature is to provide the sleeve with slightly flared ends in order to facilitate insertion of the fibres into its bore. One method of producing this flaring of the ends is by enlarging them with the tip of a heated needle.

The sleeve 14 is mounted on a pair of alumina supports 16 which are positioned to hold it extending through the central loop of an M-shaped resistance heating wire 17. The heating wire 17 is located at approximately the mid-point of the sleeve, and each support 16 is approximately mid-way between the wire 17 and the sleeve end. The width of the central loop of the heating wire is typically about 1.5mm and its depth between 3 and 4mm so that the sleeve can be inserted deep enough inside to produce a substantially uniform heating effect around the sleeve circumference. The bared end 12 of fibre 10 is inserted into the sleeve bore till its end protrudes a short distance, typically between 1 and 2mm, beyond the plane of the heating wire 17. If the sleeve is one provided with a hole 15, the sleeve is positioned with the hole just beyond the end of the fibre.

Then resistance heating wire 17 is then energised to soften the sleeve and cause it to collapse on to the fibre. This collapse is observed with a microscope, the appearance of the sleeve undergoing a change where it comes into contact with the surface of the fibre. The first part to come into contact with the fibre is that closest to the wire 17. The region of contact then extends along the fibre in both directions. The rate at which this occurs depends upon the heating conditions which can readily be adjusted to give a rate of a few millimeters per minute. It is then a simple matter to terminate the heating and hence the extension of the region of the contact when it reaches a particular point. The heating is terminated when the region of contact extends to just short of the fibre end. This is to allow for a small margin of error so that there is no risk of the bore in the region of the sleeve just beyond the fibre end collapsing to a smaller diameter than that of the fibre.

When the sleeve has cooled, it is ready for the insertion of the bared end 13 of fibre 11, but before this a fillet of adhesive 18 may be applied to the fibre 10 at the point where it emerges from the sleeve.

The end of the fibre 11 is coated with an ultra-violet light curing transparent adhesive 19, such as that manufactured by Loctite UK Ltd. under the designation 357 Optical U.V. Adhesive. This adhesive 19 performs two functions in that firstly it serves to secure the fibre within the sleeve, and secondly it acts as an index matching medium filling any space between the fibre ends. When the second fibre is butted against the first, the assembly is illuminated with ultra-violet light to cure the adhesive and thus complete the joint.

The presence of a hole 15 in the side of the sleeve facilitates the escape of air from the sleeve when the second fibre is inserted and thus reduces the risk of the entrapment of bubbles between the fibre ends. It is however possible to overcome this problem of such bubbles even when there is no hole 15.

The completed joint is weak at the point of emergence of the bared fibres from the ends of the sleeve. It is therefore preferred to slip a tubular reinforcement member 20 over one of the fibres before the end of the second fibre is introduced into the sleeve. Then when the butt joint between the fibres has been made this tubular reinforcement member is slipped back down the fibre into position over the sleeve where it is secured in position to the plastics protective coating on the two fibres to provide mechanical protection for their bared portions in the region where they emerge from the sleeve. The tubular reinforcement member may be a length of heat-shrinkable plastics tubing secured in position by heat-shrinking. Alternatively the reinforcement member may be a rigid structure, such as a length of hypodermic tubing, which is secured with a fillet 21 of a quick setting adhesive such as a cyano-acrylic adhesive.

For the joining of silica fibres the sleeve may be made of a conventional borosilicate or soda-lime glass. The thermal expansion mismatch between silica and such glasses is liable to produce a certain amount of strain where the two glasses are sealed together. Where, for mechanical or optical reasons, this strain is too large to be acceptable a high silica (c. 96% $SiO_2$) glass may be used for the sleeve, such as that manufactured under the trade mark VYCOR. Alternatively the strain may be reduced by choosing a glass with a low melting point, such as one of the lead glasses.

It is to be understood that the foregoing description of specific examples of this invention is made by way of example only and is not to be considered as a limitation on its scope.

What is claimed is:

1. A method of butt joining a pair of glass optical fibres which method includes the steps of introducing a bare end of one member of the pair of optical fibres into one end of a glass sleeve having a melting point lower than that of the fibre and a bore that is a clearance fit over the bare fibre, of heating the sleeve in the region intermediate said one end of the sleeve and the end of the fibre so as to collapse said region on to the fibre and to cause said collapsed region to propagate to substantially the end of the fibre, of introducing the end of the outer member of the pair of optical fibres into the other end of the sleeve, and of securing the two fibres in substantially butting relationship with an index matching medium between their ends, said index matching medium being an ultra-violet curing adhesive also being disposed to secure said other member to said sleeve after being exposed to ultra-violet light.

2. A method as claim 1 including the step of providing a hole in the wall of the sleeve which hole is positioned beyond the end of the fibre on to which the sleeve is collapsed by heating.

3. A method as claimed in claim 1 wherein after the sleeve is collapsed by heating on to one member of the pair of fibres a fillet of adhesive is applied to that fibre at its point of emergence from the sleeve.

4. A method as claimed in claim 1 wherein the fibres are plastics coated fibres and wherein the plastics coating is stripped from the fibre ends to a distance sufficient to enable the bared fibres to be inserted into opposite ends of the sleeve and to be butted together therein.

5. A method as claimed in claim 4 wherein a tubular reinforcement member is slipped over one end of the fibres prior to the securing of the two fibres within the sleeve, which reinforcement member is later slipped over the sleeve and secured to the plastics coating of each fibre.

6. A method as claimed in claim 5 wherein the reinforcement member is a length of heat shrinkable plastics tubing which is secured to the plastics coating of each fibre by heat shrinking.

7. A method as claimed in claim 5 wherein the reinforcement member is a rigid tube secured to the plastics coating of each fibre by fillets of adhesive applied to both ends of the tube.

* * * * *